United States Patent [19]
Polivka

[11] Patent Number: 5,960,882
[45] Date of Patent: Oct. 5, 1999

[54] DUAL-ENDED APPARATUS FOR CUTTING OPENINGS IN LINED CONDUITS

[75] Inventor: Richard Carl Polivka, Lemont, Ill.

[73] Assignee: Insituform (Netherlands) B.V., Netherlands

[21] Appl. No.: 08/787,688

[22] Filed: Jan. 23, 1997

[51] Int. Cl.[6] .................................................. E21B 29/06
[52] U.S. Cl. ........................................ 166/297; 166/55.7
[58] Field of Search .......................... 166/55, 55.2, 55.7, 166/55.8, 297

[56] References Cited

U.S. PATENT DOCUMENTS

| | | | |
|---|---|---|---|
| 4,197,908 | 4/1980 | Davis et al. | 166/55 |
| 4,442,891 | 4/1984 | Wood | 166/55 |
| 4,577,388 | 3/1986 | Wood | 29/558 |
| 4,630,676 | 12/1986 | Long, Jr. | 166/55 |
| 4,648,454 | 3/1987 | Yarnell | 166/55.7 X |
| 4,701,988 | 10/1987 | Wood | 166/55.8 |
| 4,819,721 | 4/1989 | Long, Jr. | 166/55 |
| 4,986,314 | 1/1991 | Himmler | 166/55.7 X |
| 5,105,882 | 4/1992 | Ralston et al. | 166/55.7 X |
| 5,197,540 | 3/1993 | Yagi et al. | 166/55.8 |
| 5,318,395 | 6/1994 | Driver | 409/132 |
| 5,577,864 | 11/1996 | Wood et al. | 166/55 X |

*Primary Examiner*—Frank Tsay
*Attorney, Agent, or Firm*—Cowan, Liebowitz & Latman, P.C.; Michael I. Wolfson; Lloyd G. Buchanan

[57] ABSTRACT

A motor with a single driven shaft and double-ended collet is attached to a movable work unit for cutting laterals in a lined pipeline. The motor is preferably operated by an operator at a remote location. The motor attaches to the front arm of the extension ram of a typical remote work unit, which can index at least 180° relative to the unit. The work unit is positioned in an existing conduit lined with a synthetic liner at the location of a lateral and a cutter bit at one end of the shaft is used to cut an aperture through the liner. The cutter bit is retracted radially without displacing the work unit, and the motor is indexed circumferentially 180° relative to the extension ram. This positions the finishing bit at the other end of the shaft to trim the edges of the aperture, and the finishing bit is then retracted radially. The underground work unit can then be withdrawn from the pipe.

31 Claims, 2 Drawing Sheets

DUAL-ENDED APPARATUS FOR CUTTING OPENINGS IN LINED CONDUITS

BACKGROUND OF THE INVENTION

This invention relates to an apparatus for the cutting of apertures in the lining of existing conduits and pipelines and, more particularly, is concerned with cutting improved connections between intersecting lateral pipelines and lined main pipelines, such as underground sewers.

In accordance with the established Insituform® Process for lining underground pipelines or passageways, a flexible tubular liner of a resin-absorbent material that is impregnated with a curable resin is everted into the passageway. The resin-impregnated liner, while still flexible, is held against the interior surface of the pipeline or passageway by the inverting fluid, and the resin is allowed to cure. This process is described in U.S. Pat. No. 4,064,211 and No. 4,581,085, the contents of which are incorporated herein by reference. Another process for lining existing conduits involves installation of a fold-and-formed rigid pipe. As described in U.S. Pat. No. 4,867,921 and No. 5,368,809, the contents of which are incorporated herein by reference, a thermoplastic liner is heated to render it pliable and is inserted into the pipeline in a reduced form. The deformed liner is subsequently re-rounded and allowed to harden.

The result of both processes is that the pipeline or conduit is lined with a rigid lining. These methods are extremely successful, but after installation the lining extends also across the apertures for side or branch connections, such that any side-connecting or lateral pipes that previously led into the main pipeline become blocked. These side or lateral connections must be reestablished in order for the pipeline to function as it did prior to the lining operation. As can be appreciated, the reestablishment of the side connections will entail cutting away a portion of the lining that covers each side connection, and the invention provides a device for performing this reopening in a neat, effective and efficient manner.

Because the pipelines lined are often located under ground, the matter of reestablishing the side connections involves some difficulty. Currently, equipment that is used for the reestablishment of these connections are cutters operated from a remote location and are designed to cut away the portion of the lining covering each side connection. The cutter typically includes a unit, called a "work unit," that moves along the inside of the main passageway with a TV camera mounted to the front of the work unit and that is controllable and viewable from above ground level to assist in locating the lateral connection and positioning the work unit relative thereto. The work unit also typically includes a cutting device mounted thereon.

Various cutting devices are currently in use. These cutting devices are provided with a rotary cutter bit that is rotated about an axis substantially radial to the pipe in which it operates. The cutter bit is adapted to be moved circumferentially in an angular fashion about an axis that is longitudinal of the pipe. The cutter bit can be moved longitudinally along the length of the pipe and, once the work unit is in position, is moved radially outward and inward with respect to the surface of the pipe. In addition, in some instances, the cutter bit may also be tilted forward or backward about an axis that is radial to the pipe. These various movements are provided in order to enable the cutter bit to follow the angle at which the side connection meets the main pipeline and to follow the contour of the opening that is covered by the lining material. This assures the reestablishment of the connection between the lateral and main pipe. The movements of the cutter head may be controlled by means of suitable motors, such as pneumatic, hydraulic or electric motors. Electric motors preferably are stepper motors whose movement can be controlled by digital signals. In each case, the motor is securely mounted in the cutter assembly.

Because the various cutting devices are bound to have different degrees of accuracy and precision, the result is an inexactness of the extent to which the contour cut through the pipe liner meets the aperture for the side-connecting pipe. There typically remain "shark's teeth" or "ledges" or rough edges of lining material overlapping the original opening sides that may be a means for trapping debris and waste material and may impede the connection with the main passage, in some cases leading to the eventual obstruction of the side passage by blockage. Therefore, it is desirable to trim the edges of the liner about the opening cut therethrough. One way of trimming the edges of the aperture is by using a toothed side portion of the cutting bit, which, when rotated at a high rate of speed against the edges of the aperture, grinds away and smooths the roughened edges created by the cutting bit. Unfortunately, however, the same precision and accuracy problems that plague the cutting bit in cutting also plague the cutting bit in trimming.

A more preferred device for trimming the aperture cut through the liner is a smoothing bit, such as a wire brush, because it has proven to be much more effective in smoothing any rough edges or ledges in the lining material, thereby allowing smoother flow of fluids through the aperture. A wire brush has a larger diameter than a cutter bit and requires less movement to smooth the rough spots. Additionally, a wire brush is more discriminating in that it will trim the rough edges in the polymerized synthetic resin of the liner without damaging or otherwise affecting the hard material, such as clay, cast iron or the like, of the underground conduits. Generally, such a wire brush is a separate attachment to the work unit and contains its own motor for movement of the brush in a manner similar to those discussed above with respect to the cutting bit.

A significant problem with using a wire brush for trimming the apertures cut through the liner is using a brush requires a second positioning operation of the work unit. Typically, the work unit having a TV camera and a cutter is removed from the pipeline after the opening in the lining is cut. The cutter bit is removed and the wire brush is placed in its stead, and the work unit is pulled back through the existing pipeline for trimming of the edges of the apertures just cut through the liner by the drill bit. Unfortunately, this repeat operation is inefficient in terms of time, cost and labor.

It is, therefore, desirable to provide a device that would allow cutting of the aperture and trimming of edges at the junction of the main pipeline and side connection in one operation.

SUMMARY OF THE INVENTION

Generally speaking, in accordance with the invention, a motor with two opposed collets for cutting laterals in a lined pipeline is provided. A first collet is for mounting a cutting bit for cutting an aperture through the liner in order to reestablish connections with lateral-connecting pipelines. The second collet is for mounting a finishing tool for trimming and smoothing the edges of the aperture cut by the router bit. The motor preferably has a single driven shaft so that, when the motor is rotated 180°, both elements mounted in the collets are in an operative position and rotate in the same direction.

The dual-collet motor attaches to the front arm of the extension ram of a typical work unit, which can index at least 180° relative to the work unit to place either the cutter bit or finishing tool in an operative position. The work unit is positioned in the lined conduit, and the cutter bit is used to cut an aperture through the liner. The cutter bit retracts radially into the main pipeline without displacing the work unit, and the motor is indexed circumferentially 180° relative to the work unit. This positions the finishing tool to trim the edges of the aperture, after which the finishing tool is then retracted radially. The underground work unit can then be moved to the next cutting location or withdrawn from the pipe. The motor may be pneumatic, hydraulic or electric.

Accordingly, it is an object of the invention to provide an improved device for cutting apertures in the lining an existing pipe and for smoothing the edges of the apertures, without requiring repositioning of the device.

Another object of the invention is to provide an improved lateral cutting device for lined pipelines which has two collets for mounting work pieces and which can be operated without repositioning the device in a remote location.

A further object of the invention is to provide a two-ended motor with a single shaft and two collets for mounting work pieces on opposite ends of the motor shaft.

Still other objects and advantages of the invention will in part be obvious and will in part be apparent from the specification.

The invention accordingly comprises the several steps and the relation of one or more of such steps with respect to each of the others, and the apparatus embodying features of construction, combination(s) of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawing(s), in which.

DETAILED DESCRIPTION OF THE INVENTION

Figure 1:
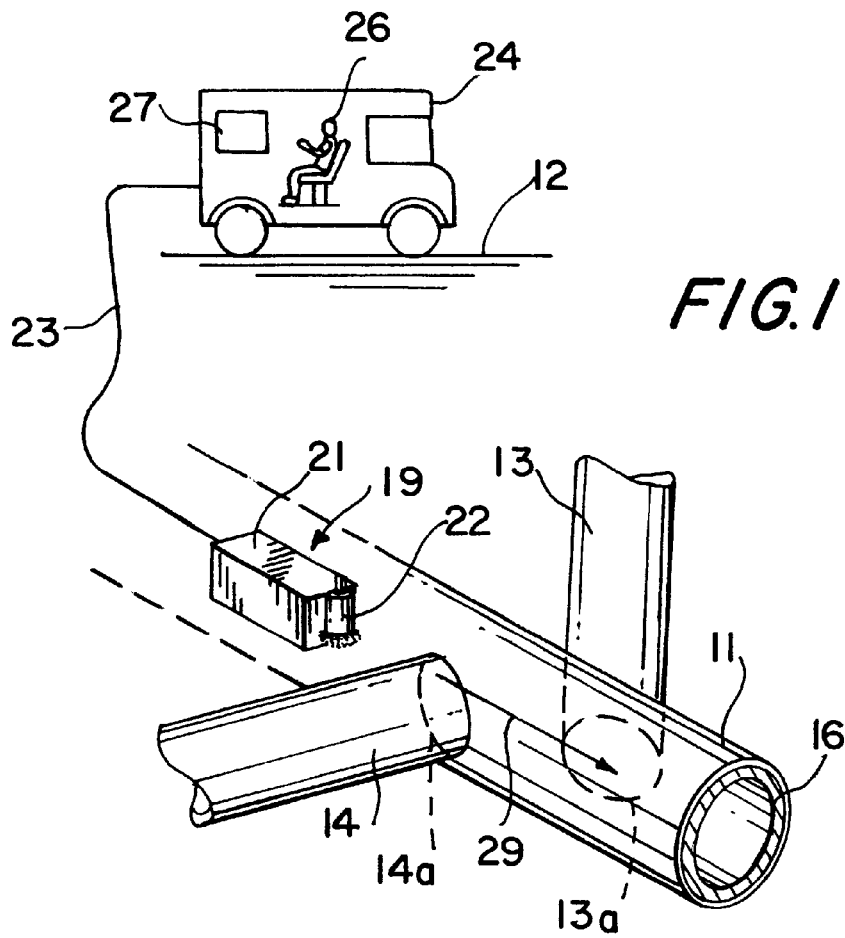
FIG. 1 is a schematic perspective view of a section of underground pipeline, showing side connections to be reestablished after the lining operation and position of an operator.
Figure 2:
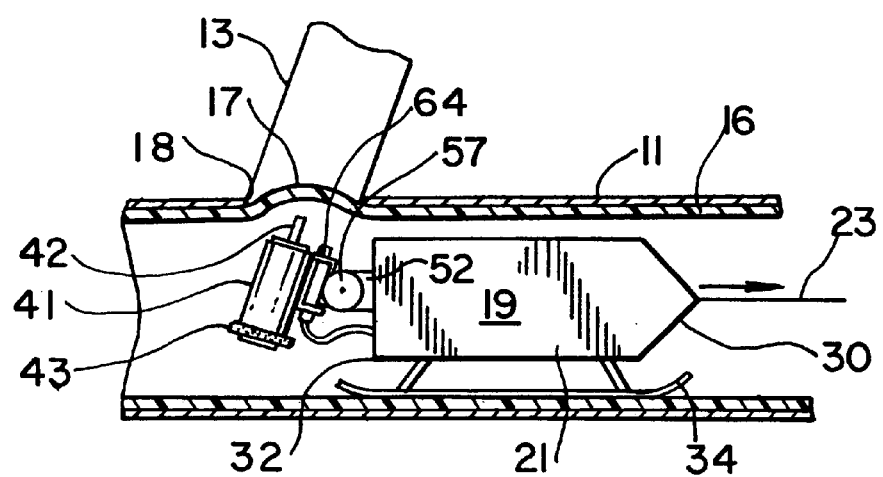
FIG. 2 is a partial elevational view in cross-section of the pipeline of FIG. 1 with a cutting apparatus constructed and arranged in accordance with the invention operatively positioned within.

FIGS. 1 and 2 show an existing main conduit or pipeline 11. In the case of sewer pipe, this is typically located below ground level 12. When pipeline 11 is a main sewer pipeline, as shown in FIG. 1, it will have side service connections 13 and 14. Because pipeline 11 is in a state of disrepair, it has been relined with a synthetic lining 16. Lining 16 may be formed by installing a flexible resin impregnated liner as described above. Alternatively, lining 11 may be of the fold-and-formed type which typically is a substantially rigid thermoplastic liner.

After lining 16 has been installed, a portion 17 covering an aperture 18 of side connection 13 must be removed. A remote-controlled cutting assembly 19 is used to perform this removal operation. Assembly 19 includes a displaceable chassis 21 and cutter head 22 and is remotely coupled via a control line 23 to a vehicle 24 at ground level 12 in which an operator 26 sits. Vehicle 24 is provided with a monitor 27, to which signals are sent via line 23 from a TV camera (not shown) attached to assembly 19, for viewing the interior of pipeline 11 as assembly 19 is displaced along the axis of pipeline 11. The TV camera may be mounted on chassis 21 or, more preferably, may be mounted on a separate trolley, as shown in U.S. Pat. No. 4,630,676 and No. 4,701,988. Assembly 19 is pulled or propelled through pipe 11, for example, as indicated in FIG. 1 by an arrow 29. Operation and control of these remote cutter apparatuses are described in U.S. Pat. No. 4,197,908, No. 4,442,891 and 4,701,988, the contents of which are incorporated herein by reference.

Figure 3:
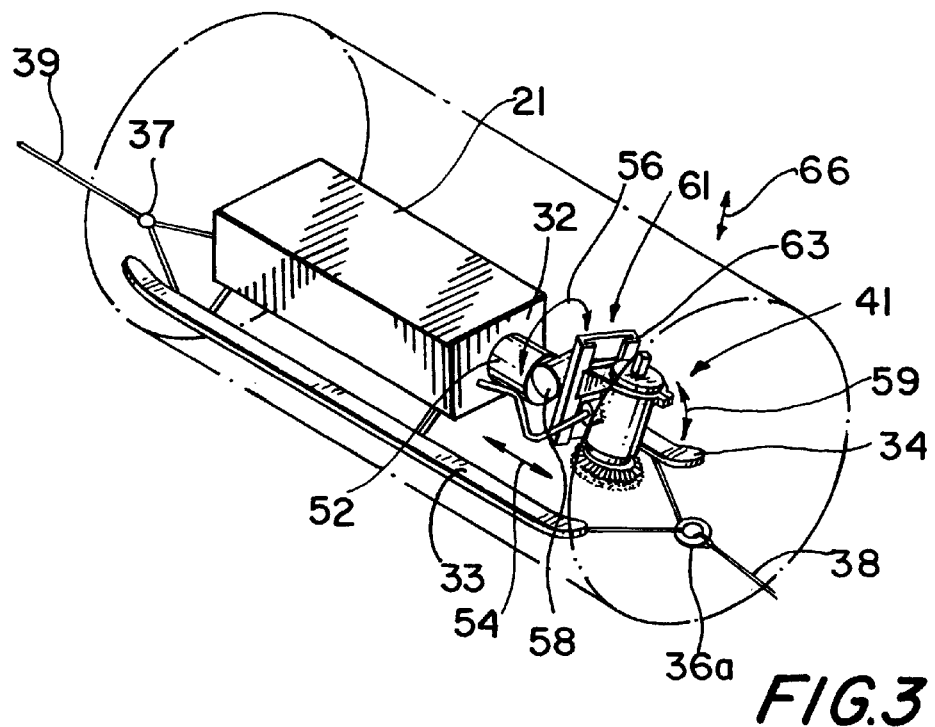
FIG. 3 is a perspective view of the work unit of FIG. 2 positioned within a pipeline.

FIGS. 2 and 3 illustrate dramatically cutter head 22 which includes a double-ended motor 31 constructed and arranged in accordance with the invention. As with many conventional pipe cutters, apparatus 19 includes chassis 21 with a front end 32 and a back end 30 which is supported on two skids 33 and 34. A pull shackle 36 and a restraining shackle 37 are used to mount pull and restraining cables 38 and 39, respectively, for displacing assembly 19. In this embodiment, a TV camera is arranged for viewing the interior of pipe 11 before and after liner 16 is installed and while the cutting of opening 13a and 14a for side connecting pipes 13 and 14 takes place. The camera can pivot about two orthogonal axis whereby any portion of the interior of pipeline 11 or lining 16 can be viewed by operator 26 on monitor 27.

Figure 4:
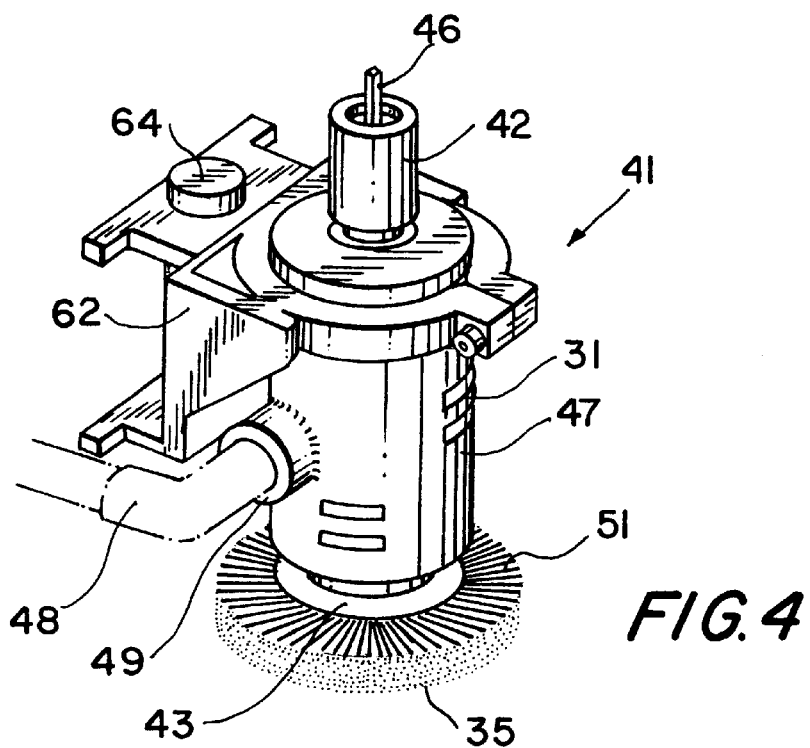
FIG. 4 is a perspective view of the cutter/brush assembly constructed and arranged in accordance with the invention in the cutter apparatus of FIGS. 2 and 3.

As shown in FIG. 4, a cutter/brush device 41 constructed and arranged in accordance with the invention, including double-ended motor 31 with a cutter collet 42 and an opposed finishing collet 43, has a generally cylindrical motor casing 47. A cutter bit 46 for cutting an opening through liner 16 is clamped into collet 42 in standard fashion, preferably using a three-jaw chuck. Other types of mounting devices for attaching a cutter bit are acceptable.

Any size cutter head may be used, but a ⅜-inch bit or shank router bit, having a ⅝-inch diameter shank and an 11 threads-per-inch ratio has been successful. This has been found to provide the best cut through a cured-in-place synthetic liner 11 to form openings 13a and 14a. Motor 31 has a cylindrical casing 47, and cutter bit 46 is mounted thereon and is rotated about its longitudinal axis. Application of cutting head 46 against liner 11 will cause liner 11 to be cut by cutting head 46. Various types of motors for this purpose are well known, and one such motor is disclosed in U.S. Pat. No. 4,442,891 (Wood). Motor 31 is preferably a fluid-driven motor and can be either pneumatic, as in U.S. Pat. No. 4,197,908 (Davis, et al.), or hydraulic, as in U.S. Pat. No. 4,630,676 (Long). In a preferred embodiment, motor 31 is pneumatic and is provided with a source of air via hose 48 coupled to an air inlet 49.

A wire brush 51 for trimming openings 13a and 14a in liner 16 cut by cutter bit 46 is mounted in collet 43 at the opposite end of the shaft (not shown). Brush 51 may be of any known and commonly-used brushes for this purpose and can be of various different shapes but is preferably cylindrical. Brush 51 has a plurality of bristles extending radially of its core that should be of a material sufficiently rigid to cut off portions of the synthetic liner and trim the edges of the aperture but should be not too hard such that the material of the underground conduit is damaged. Motor 31 drives brush 51 in the same direction as the rotation of cutter bit 46. Application of brush 51 against the edges of hole 13a cut by cutter bit 46 will cause the rough material at the edges of said aperture to be smoothed.

Cutter/brush device 41 is mounted to chassis front 32 by several pivoting mechanisms to allow cutter/brush device 31 to move in a variety of directions within pipeline 11. A preferred example is shown best in FIG. 3, although one skilled in the art will appreciate that others will function equally well. The first mechanism is an extension ram 52, which, when extended, projects forwardly of chassis 21. Ram 52 is adapted to move in and out of the front 32 of chassis 21 along the direction of an arrow 54, which is parallel to the common direction of the axis of ram 52 and pipeline 11. Ram 52 is also adapted to rotate clockwise or counterclockwise about its own axis, in the direction of an arrow 56. This will permit rotation of cutter/brush device 41 circumferentially about the interior of lined pipeline 11. These movements are effected by a motor mounted within chassis 21 and controlled remotely by operator 26.

A transverse rotational cylinder 58 is mounted at the distal end of ram 52 to allow cutter/brush device 41 to be tilted in opposite directions about an axis transverse to the longitudinal axis of ram 52 and pipeline 11. Cutter/brush device 41 can be pivoted toward the rear or front of chassis 21 along a line parallel to the axis of pipeline 11 by operation of a tilt cylinder 58. Arrow 59 shows the rotational direction of this tilt, which is about a radial axis perpendicular to the longitudinal axis of pipeline 11. Cylinder 58 effectively tilts device 41 backwards or forwards and allows cutter head to operate at any angle above chassis 21. This function is especially useful for cutting apertures for lateral pipelines 13 and 14 that connect with the main pipeline 11 at angles other than 90°. This type of pivoting mechanism or any other that allows the cutter/brush device 41 to pivot in this direction is acceptable.

Motor 31 is mounted on a radially displacing mechanism 61 provided to displace cutter/brush device 41 radially within pipeline 11 towards liner 16. Cutter/brush device 41 is fixedly mounted on a bracket 62 which is mounted in a slidable relation in a track 63 on the distal end of cylinder 58. A thrust in piston 64 drives device 41 up or down in a radial direction. By this attachment, cutter/brush device 41 is slidable in a direction tangential to cylinder 58, shown by an arrow 66, such that, when cutter/brush device 41 is in operation, either cutter bit 46 or brush 51 can be indexed radially towards or away from the wall of liner 16. Bracket 62 is also a clamp that serves to secure cutter/brush device 41 within track 63. Device 41 can be displaced radially by a rack and pinion mechanism which can index bracket 62 in the desired direction.

In operation, pipeline 11 has been relined with a lining 16, preferably through one of the methods described above, which typically provides a liner of synthetic material. As discussed, the lining operations have covered the apertures for lateral pipe connections, and it is now required to remove portion 17 of liner 16. Assembly 19 is pulled or propelled into liner 16 interior of pipeline 11, by pull cable 38. The various pivoting and adjusting mechanism allow cutter bit 46 to cut through liner 16 in a desired pattern for example, as shown in U.S. Pat. No. 4,577,388 (Wood). Once the cutting operation is complete and an aperture has been completely cut through liner 16, cutter bit 46 retracts by radial mechanism 61, and motor 31 is indexed 180° relative to extension ram 52. Now, brush 51 is positioned where cutter bit 46 had just been positioned and is in position to trim the edges of opening 13a just cut. Wire brush 51, which rotates in the same direction as cutter bit 46, then trims and smooths the edges of the aperture as needed and is retracted. Once this smoothing operation is complete, underground work assembly 19 can then be withdrawn from pipeline 11 or can be moved to the next cutting location.

By providing a dual-ended motor, both the cutting and smoothing operations of reconnecting the laterals can be accomplished with one operation of the work unit. This saves time by not having to remove the work unit, install a new tool in the motor and then reposition the work unit in the conduit. Both cutting and smoothing take place simply by rotating the motor 180° to put the other bit in position.

It will thus be seen that the objects set forth above, among those made apparent from the preceding description, are efficiently attained and, since certain changes may be made in the above construction(s) without departing from the spirit and scope of the invention, it is intended that all matter contained in the above description or shown in the accompanying drawing(s) shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An apparatus for cutting openings in the lining of an existing pipeline from the inside of said pipeline, said apparatus adapted to be mounted to a unit that is movable within said pipeline, said apparatus comprising:

a motor having a shaft with first and second ends, said motor being rotatably mounted to said movable unit;

a cutting means for cutting an opening in the lining mounted to the first end of said shaft;

a finishing means for smoothing the edge of the opening cut by said cutting means mounted to the second end of said shaft; and indexing means for selectively rotating said motor relative to said movable unit;

whereby, after said cutting means cuts an opening in said lining, said indexing means selectively rotates said motor to position said finishing means in operative position for smoothing the edges of said opening.

2. The apparatus of claim 1, further comprising radial displacing means for selectively displacing said motor in a radial direction towards and away from said lining, whereby, after said aperture is cut in said lining, said cutting means can be retracted away from said lining and, after said motor is rotated 180°, said finishing means can be moved towards said lining.

3. The cutting apparatus of claim 2, wherein said motor comprises a fluid-driven motor.

4. The cutting apparatus of claim 3, wherein said motor comprises a pneumatically-operated motor.

5. The cutting apparatus of claim 2, wherein said motor comprises a hydraulically-operated motor.

6. The cutting apparatus of claim 1, wherein said motor comprises an electrically-operated motor.

7. The cutting apparatus of claim 1, wherein said cutting means comprises a router bit.

8. The cutting apparatus of claim 1, wherein said finishing means comprises a circular brush with radially-oriented bristles.

9. The cutting apparatus of claim 8, wherein said brush bristles are formed of wire.

10. The cutting apparatus of claim 1, wherein said indexing means for comprises an arm extending forward from said movable unit in the longitudinal direction of said pipeline, wherein said arm is rotatable about its own longitudinal axis within said unit.

11. The cutting apparatus of claim 1, further comprising means to angularly position said motor in relation to said movable unit such that the positioning of said motor at a particular angle results in an aperture being cut at the same angle.

12. An apparatus for cutting apertures in the lining of an existing conduit from the inside of the conduit, comprising:
   a movable unit selectively displaceable along the axis of the conduit and controlled at a location remote from the location where said aperture is to be cut;
   a cutter apparatus rotatably mounted to one end of said moveable unit, including a motor having one rotating shaft with a first end and an opposite second end and means for mounting operative means on both ends of said shaft;
   cutter means for cutting an opening in said lining mounted in the mounting means at said first end of said motor shaft;
   a finishing means for smoothing the opening cut in said liner mounted in the mounting means at said second end of said motor shaft;
   said motor mounted on said movable unit being selectively displaceable in at least a radial direction to move said cutter means in an operative position inside said conduit towards the lining to cut an opening in said lining and to retract, said motor being selectively rotatable at least 180 degrees circumferentially to position the finishing means in an operative position to move radially towards and away from the opening in the lining to smooth the opening cut by the cutter means.

13. The cutting apparatus of claim 12, wherein said movable unit is in communication with an operator at a remote location outside said conduit.

14. The cutting apparatus of claim 13, wherein said remote communication takes place via a control line extending through said conduit.

15. The cutting apparatus of claim 12, wherein said movable unit comprises means for rotatably mounting said cutter apparatus to said movable unit such that said motor is rotatable at least 180° relative to the inside circumference of said conduit whereby said cutter means and said finishing means can switch positions.

16. The cutting apparatus of claim 15, wherein said means for rotatably mounting comprises a cylindrical arm projecting from said one end of said movable unit, said cutter apparatus mounted at a distal end of said arm, wherein said cylindrical arm is rotatable about its own longitudinal axis within said movable unit.

17. The cutting apparatus of claim 16, wherein said cylindrical arm is rotatable at least 180° within said movable unit.

18. The cutting apparatus of claim 16, wherein said movable unit further comprises a motor and wherein rotation of said cylindrical arm and said cutter apparatus is controlled by said motor.

19. The cutting apparatus of claim 16, wherein said movable unit comprises means for moving said cutter apparatus longitudinally within said conduit relative to said movable unit.

20. The cutting apparatus of claim 19, wherein said means for moving said cutter apparatus longitudinally comprises said cylindrical arm, wherein said cylindrical arm is movable along its own longitudinal axis within said movable unit.

21. The cutting apparatus of claim 20, wherein said movable unit further comprises a motor and wherein longitudinal motion of said cylindrical arm and said cutter apparatus is controlled by said motor.

22. The cutting apparatus of claim 12, wherein said motor comprises a fluid-driven motor.

23. The cutting apparatus of claim 22, wherein said motor is a pneumatically-operated motor.

24. The cutting apparatus of claim 22, wherein said motor is a hydraulically-operated motor.

25. The cutting apparatus of claim 12, wherein said motor is an electrically-operated motor.

26. The cutting apparatus of claim 12, wherein said cutter means is a router bit.

27. The cutting apparatus of claim 12, wherein said finishing means comprises circular brush with radially-oriented bristles.

28. The cutting apparatus of claim 12, wherein said cutter apparatus further comprises means to angularly position said motor in relation to said movable unit such that the positioning of said motor at a particular angle results in the opening being cut at the same angle relative to said conduit.

29. A method for cutting openings in the lining of an existing conduit from the inside of said conduit, using a movable unit being selectively displaceable along the axis of the conduit and having a cutter apparatus rotatably mounted to one end of said unit, said cutter apparatus having one rotating shaft with a cutting means mounted at a first end of said shaft and a finishing means mounted at a second end of said shaft, said method comprising:
   cutting an opening in said lining using said cutting means mounted at said first end of said motor shaft;
   selectively rotating said motor at least 180 degrees circumferentially to position the finishing means in an operative position; and
   smoothing the opening cut in said liner using said finishing means mounted at said second end of said motor shaft.

30. The method of claim 29, wherein said motor mounted on said movable unit is selectively displaceable in at least a radial direction to move said cutting means or said finishing means inside said conduit towards the lining and to retract away from the lining, further comprising:
   selectively moving said cutting means into an operative position radially towards the lining before cutting an opening in said lining;
   selectively retracting said cutting means radially away from the lining after cutting an opening in said lining;
   after selectively rotating said motor at least 180 degrees circumferentially, selectively moving said finishing means radially towards from the opening in the lining into an operative position before smoothing the opening cut by the cutting means.

31. The method of claim 29, further comprising selectively displacing said movable unit along the axis of the conduit away from said opening.

* * * * *